(12) United States Patent
Pennec et al.

(10) Patent No.: US 12,180,947 B2
(45) Date of Patent: Dec. 31, 2024

(54) COMPRESSION DEVICE, INSTALLATION, FILLING STATION AND METHOD USING SUCH A DEVICE

(71) Applicant: L'Air Liquide, Societe Anonyme pour l'Etude et l'Exploitation des Procedes Georges Claude, Paris (FR)

(72) Inventors: Yan Pennec, Sassenage (FR); Rasmey Try, Sassenage (FR)

(73) Assignee: L'Air Liquide, Societe Anonyme Pour l'Etude et l'Exploitation des Procedes, Georges Claude Paris (FR)

( * ) Notice: Subject to any disclaimer, the term of this patent is extended or adjusted under 35 U.S.C. 154(b) by 323 days.

(21) Appl. No.: 17/799,411

(22) PCT Filed: Dec. 17, 2020

(86) PCT No.: PCT/EP2020/086609
§ 371 (c)(1),
(2) Date: Aug. 12, 2022

(87) PCT Pub. No.: WO2021/160326
PCT Pub. Date: Aug. 19, 2021

(65) Prior Publication Data
US 2023/0067385 A1 Mar. 2, 2023

(30) Foreign Application Priority Data

Feb. 12, 2020 (FR) ..................... 2001365

(51) Int. Cl.
*F04B 15/08* (2006.01)
*F04B 37/20* (2006.01)

(52) U.S. Cl.
CPC .............. *F04B 15/08* (2013.01); *F04B 37/20* (2013.01); *F17C 2221/012* (2013.01);
(Continued)

(58) Field of Classification Search
CPC ........ F17C 2221/012; F17C 2227/0164; F17C 2265/065; F17C 2270/0139; F04B 15/06; F04B 15/08; F04B 37/18; F04B 37/20
See application file for complete search history.

(56) References Cited

U.S. PATENT DOCUMENTS

| | | | |
|---|---|---|---|
| 8,176,748 B2 * | 5/2012 | Cao ........................... | F01C 1/22 62/401 |
| 9,388,801 B2 * | 7/2016 | Rietkerk ................. | F04B 37/18 |

(Continued)

FOREIGN PATENT DOCUMENTS

| | | |
|---|---|---|
| DE | 197 16 414 | 7/1998 |
| EP | 3 414 498 | 12/2018 |

(Continued)

OTHER PUBLICATIONS

International Search Report and Written Report for PCT/EP2020/086609, mailed Feb. 4, 2021.
French Search Report for FR 2 001 365, mailed Sep. 15, 2020.

*Primary Examiner* — Filip Zec
(74) *Attorney, Agent, or Firm* — Justin K. Murray (57) ABSTRACT

The invention relates to a fluid-compression device including a compression chamber comprising a movable piston, the device comprising a first end housing a first end of the compression chamber, the device comprising a second end housing a second end of the compression chamber, the piston being translatable between the first and second ends of the compression chamber, the device comprising a regeneration pipe connecting the first and second ends of the compression chamber and including a regenerator, the device comprising a supply pipe comprising an upstream end intended to be connected to a source of fluid to be compressed and a downstream end opening into the first end of the compression chamber, the supply pipe comprising a valve assembly, the device comprising a pipe for discharging the compressed fluid comprising an upstream end connected to the compression chamber and a downstream end intended to be connected to a receiver of the compressed fluid, the discharge pipe comprising a valve assembly, characterized in that the upstream end of the supply pipe is connected directly to the first end of the compression chamber, i.e. without passing through a pre-compression chamber in the first end of the device.

18 Claims, 5 Drawing Sheets

(52) U.S. Cl.
CPC ............... *F17C 2227/0164* (2013.01); *F17C 2265/065* (2013.01); *F17C 2270/0139* (2013.01)

(56) References Cited

U.S. PATENT DOCUMENTS

| | | | |
|---|---|---|---|
| 10,677,235 B2* | 6/2020 | Nagura | F28D 9/00 |
| 2005/0260080 A1* | 11/2005 | Miura | F04B 5/02 |
| | | | 417/313 |
| 2019/0063791 A1 | 2/2019 | Durand | |
| 2020/0325884 A1* | 10/2020 | Allison | F04B 41/06 |
| 2021/0332950 A1* | 10/2021 | Petitpas | F04B 53/144 |
| 2023/0080231 A1* | 3/2023 | Benistand-Hector | |
| | | | F04B 53/162 |
| | | | 141/67 |
| 2023/0085780 A1* | 3/2023 | Benistand-Hector | F04B 7/04 |
| | | | 62/50.6 |

FOREIGN PATENT DOCUMENTS

| | | |
|---|---|---|
| FR | 2 904 401 | 2/2008 |
| GB | 712 340 | 7/1954 |

\* cited by examiner

COMPRESSION DEVICE, INSTALLATION, FILLING STATION AND METHOD USING SUCH A DEVICE

CROSS-REFERENCE TO RELATED APPLICATIONS

This application is a § 371 of International PCT Application PCT/EP2020/086609, filed Dec. 17, 2020, which claims § 119(a) foreign priority to French patent application FR 2001365, filed Feb. 12, 2020.

BACKGROUND

Field of the Invention

The invention relates to a compression device, an installation, a filling station and method using such a device.

The invention relates more particularly to a fluid compression device having a compression chamber comprising a mobile piston, the device comprising a first end accommodating a first end of the compression chamber, the device comprising a second end accommodating a second end of the compression chamber, the piston being able to move in translation between the first and second ends of the compression chamber, the device comprising a regeneration pipe connecting the first and second ends of the compression chamber and having a regenerator, the device comprising a supply pipe comprising an upstream end intended to be connected to a source of fluid to be compressed and a downstream end opening into the first end of the compression chamber, the supply pipe comprising a set of one or more valves, the device comprising a compressed fluid discharge pipe comprising an upstream end connected to the compression chamber and a downstream end intended to be connected to a receiver of the compressed fluid, the discharge pipe comprising a set of one or more valves.

Related Art

The document FR2904401A1 describes such a compression device, which is sometimes called a "thermal compressor". This device is satisfactory but is demanding as regards its manufacture or its maintenance. Specifically, the sealing of the pre-compression piston and its control are relatively complex and expensive to implement. In addition, the outgoing compressed gas has thermodynamic conditions (temperature in particular) that make it difficult to arrange a plurality of compression stages in series.

SUMMARY OF THE INVENTION

An aim of the present invention is to remedy all or some of the drawbacks of the prior art that are set out above.

To this end, the device according to the invention, which is otherwise in accordance with the generic definition thereof given in the above preamble, is essentially characterized in that the upstream end of the supply pipe is connected directly to the first end of the compression chamber, i.e. without passing through a pre-compression chamber in the first end of the device.

Furthermore, embodiments of the invention may have one or more of the following features:
- the upstream end of the compressed fluid discharge pipe is connected to the first end of the compression chamber,
- the set of one or more valves of the supply pipe (8) comprises a non-return member such as a non-return valve,
- the set of one or more valves of the discharge pipe comprises a non-return member such as a non-return valve,
- the second end of the device comprises a heating system,
- the first end of the device comprises a cooling or heating system,
- the regenerator comprises a heat exchanger tube, in particular a cylindrical tube, filled with a material configured to store and release the heat and to allow the fluid in the liquid and/or gaseous state to pass,
- the fluid is chosen from the list comprising He, H2, Ne, CO, Ar, N2, O2, CH4, CO2, NO, Kr, Xe or any mixture of two or more of these chemical species.

The invention also relates to a compression installation comprising a plurality of compression devices in accordance with any one of the features above or below.

The invention also relates to a pressurized gas tank filling station comprising a source of liquefied gas, a circuit for transferring fluid from the source toward a distribution end, the transfer circuit comprising a compression device in accordance with any one of the features above or below or an aforementioned compression installation.

According to other possible particular features:
- the transfer circuit comprises at least one store of pressurized gas compressed by the compression device, said store being disposed between the compression device and the distribution end,
- the transfer circuit comprises a pump disposed between the source of liquefied gas and the compression device The invention also relates to a method for compressing fluid by means of a device in accordance with any one of the features above or below or of an aforementioned installation, the method comprising the following successive steps: a) admission of a fluid in the liquid or gaseous state at an initial pressure into the first end of the compression chamber via the supply pipe, b) movement of the piston toward the first end of the compression chamber and transfer of the fluid from the first end of the compression chamber toward the second end of the compression chamber via the regeneration pipe, the second end of the device being kept at a temperature higher than the temperature of the first end, c) movement of the piston toward the second end of the compression chamber and transfer of the fluid from the second end of the compression chamber toward the first end of the compression chamber and the downstream end of the discharge pipe.

According to one possible particular feature, the fluid can be compressed at a flow rate of 10 to 100 grams per second, in particular 50 grams per second.

The invention can also relate to any alternative device or method comprising any combination of the features above or below within the scope of the claims.

BRIEF DESCRIPTION OF THE FIGURES

Further particular features and advantages will become apparent upon reading the following description, which is provided with reference to the figures, in which.

Figure 1:
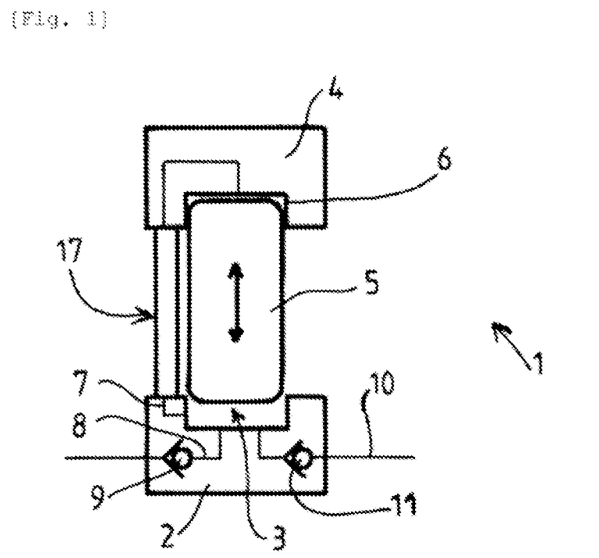
FIG. 1 shows a schematic and partial view in cross section illustrating an example of the structure and operation of an exemplary embodiment of a compression device according to the invention.

The fluid compression device 1 illustrated in [FIG. 1] comprises a frame or casing accommodating a compression chamber in which a mobile piston 5 is housed. The device 1 comprises a first end 2 accommodating a first end 3 of the compression chamber, the device 1 comprising a second end 4 accommodating a second end 6 of the compression chamber.

The piston 5 is able to move in translation between the first 3 and second 6 ends of the compression chamber (via any suitable drive system, which is not described for the sake of simplicity).

The device 1 comprises a regeneration pipe 7 connecting the first 3 and second 6 ends of the compression chamber and having a regenerator 17.

The device 1 also comprises a supply pipe 8 having an upstream end intended to be connected to a source 13 of fluid to be compressed and a downstream end opening into the first end 3 of the compression chamber. The supply pipe 8 comprises a set of one or more valves, in particular a non-return valve 9. The device 1 comprises a compressed fluid discharge pipe 10 comprising an upstream end connected to the compression chamber and a downstream end intended to be connected to a receiver of the compressed fluid. This discharge pipe 10 also comprises a set of one or more valves, for example a non-return valve 11. The regeneration pipe 7 is separate from the discharge pipe 10. This means that this regeneration pipe 7 connects the two ends 3, 6 of the compression chamber by passing through the regenerator and thus allows only direct transit between these ends during moments of the piston 5.

The upstream end of the supply pipe 8 is connected directly to the first end 3 of the compression chamber, i.e. without passing through a pre-compression chamber in the first end 2 of the device. This means that, unlike the structure described in the document FR2904401A1, the frame of the compression device 1 does not comprise a pre-compression chamber upstream of the first end 3 of the compression chamber. The fluid to be compressed is injected directly into the compression chamber 3. This makes it possible to overcome the technical constraints necessary in the prior art (actuation of an additional piston and sealing in particular).

Moreover, the elimination of this pre-compression increases the reliability of the device without harming its performance.

Figure 6:
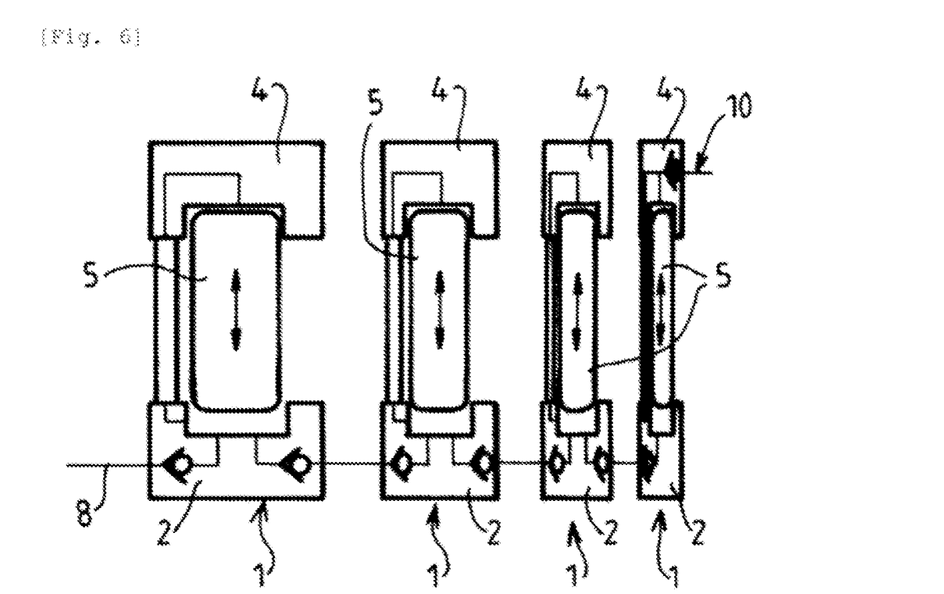
FIG. 6 shows a schematic and partial view in cross section, illustrating an example of the structure and operation of an exemplary embodiment of a compression installation comprising a plurality of compression devices according to the invention.

As illustrated, the upstream end of the compressed fluid discharge pipe 10 is preferably connected to the first end 3 of the compression chamber. This means that the compressed fluid is discharged from the relatively cold end 3 of the device 1. This makes it possible to produce relatively cold compressed fluid. This makes it possible, for example, to dispose a plurality of compression devices 1 in series as illustrated in [FIG. 6]. Thus, the downstream end of the discharge pipe 10 of a compression device 1 can be connected to the upstream end of the supply pipe 8 of a subsequent compression device 1.

For a perfect gas, the maximum possible compression ratio is the temperature ratio between the hot chamber (second end 6 of the compression chamber) and the cold chamber (first end 3 of the compression chamber). Thus, the second end 4 of the device 1 can comprise a fluid heating system 12.

Figure 7:
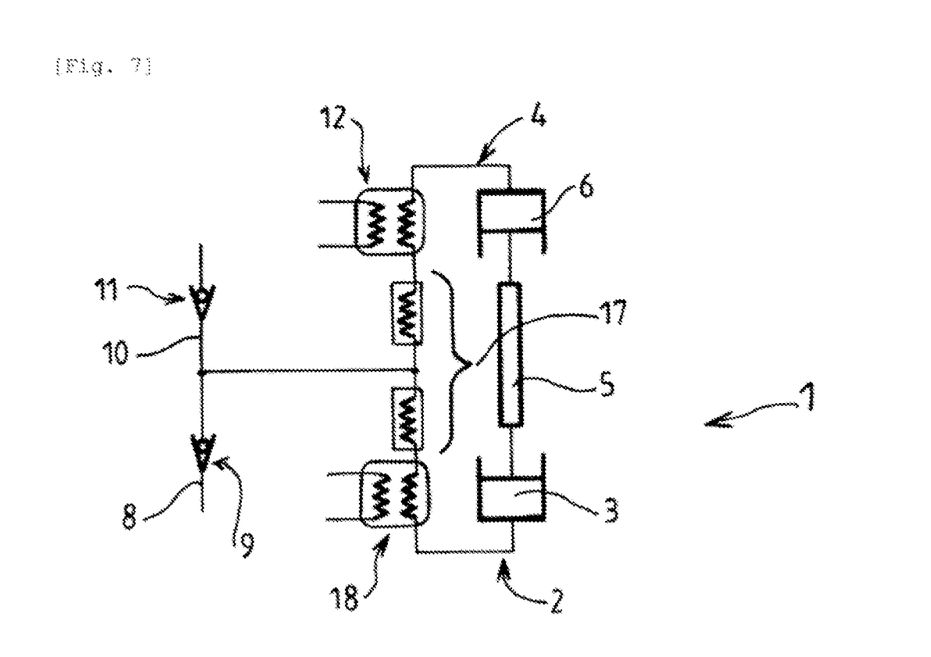
FIG. 7 shows a schematic and partial view illustrating an example of the structure and operation of another exemplary embodiment of a compression device according to the invention.

For example, the temperature of the fluid in the second end 6 of the compression chamber can be between 200 and 1000 K and can typically reach 500 K via, for example, heating, for example electrical heating (cf. the example in [FIG. 7] in which the heat exchanger 12 can be at a temperature of 500K). It should be noted that a higher compression ratio can be obtained by taking advantage of the phase transition or by taking precise thermodynamic paths in the supercritical phase.

Thus, a single compression stage cannot easily exceed a compression ratio of ten for all practical purposes (unless the inlet receives liquid, then the compression ratio can reach several hundred or a thousand or more).

The use of compression devices 1 in series is then advantageous. For better efficiency, it is preferable to vary the volume flow rate in order to preserve the mass flow rate; i.e., at each stage of the series, to reduce the volume of the chambers 3, 6 and to manage the frequency of movement of the piston 5 so as to ensure an optimal gas flow rate. In addition, the final compression stage can discharge if necessary into the "hot" chamber (at the second end 4 of the device as illustrated in [FIG. 4]).

Conventionally, the regenerator 17 can comprise a heat exchanger tube, in particular a cylindrical tube, filled with a material configured to store and release the heat and to allow the fluid in the liquid and/or gaseous state to pass. Of course, any other suitable heat exchanger structure can be envisaged, for example the regenerator 17 could at least partially surround the piston (like two concentric cylinders) and/or the regenerator 17 could comprise a series of tubes of which the material is the regenerative element and/or an exchanger with fins cut out of the mass.

Figure 2:
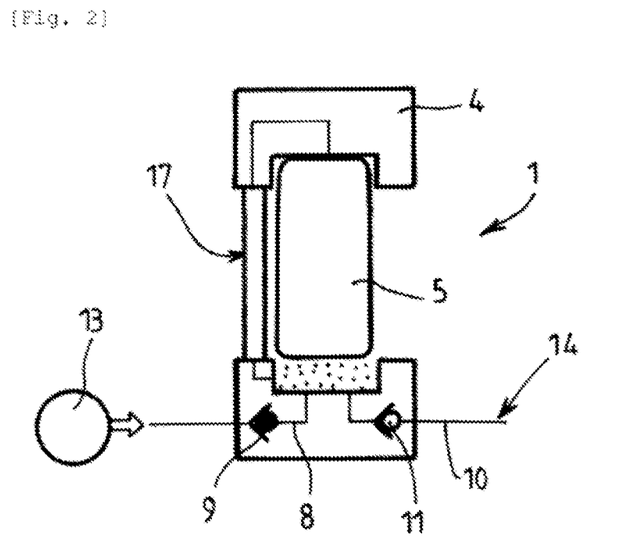
FIG. 2 shows a schematic and partial view in cross section of the compression device in a first operating configuration.

Referring to [FIG. 2], in a first step, the piston 5 is in the extreme position in the second end 6 of the compression chamber (relatively hot side of the device 1). The valve 9 of the supply pipe 8 is open, fluid (gas or liquid) is introduced and fills the volume of the first end 3 of the compression chamber (from a source 13).

Then ([FIG. 3]), the piston 5 is actuated toward the first end 3 of the compression chamber. This leads to a transfer of fluid from the first (cold) end 3 toward the second (hot) end 6. It should be noted that no net force is needed since the total volume of the system remains unchanged. In practice, the force needed is limited only by the impedance of transfer of the gas through the regenerator 17. When the gas heats up in the second, hot end 6, the pressure in the system begins to increase.

Figure 3:
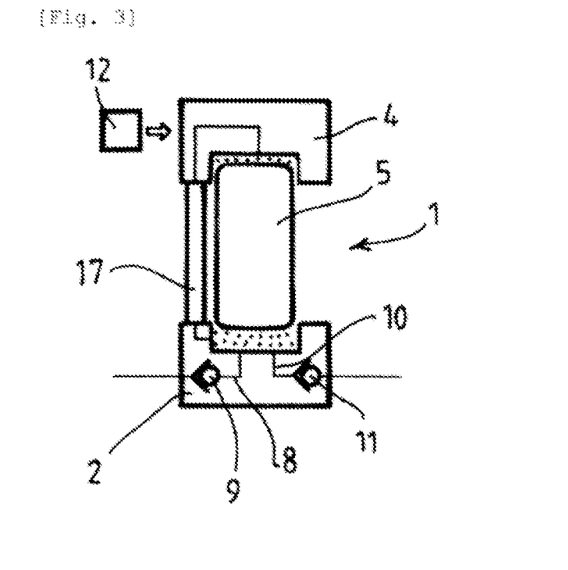
FIG. 3 shows the compression device in a second operating configuration.

The valve 9 of the supply pipe 8 is closed and the valve 11 of the discharge pipe 10 remains closed as long as the pressure in the first end 3 of the compression chamber is below an opening threshold (for example the pressure of an outlet tank connected to the discharge pipe 10). Preferably, the dead volume of the piping and of the regenerator 17 should be limited as much as possible so as to minimize the transfer mass needed to open the valve 11 of the discharge pipe 10 (typically less than 10% of the value of the volume of the compression chambers).

When the piston 5 reaches its extreme position at the bottom of the first end 3 of the compression chamber ([FIG. 4]), it preferably occupies all of this end volume of the compression chamber.

Figure 4:
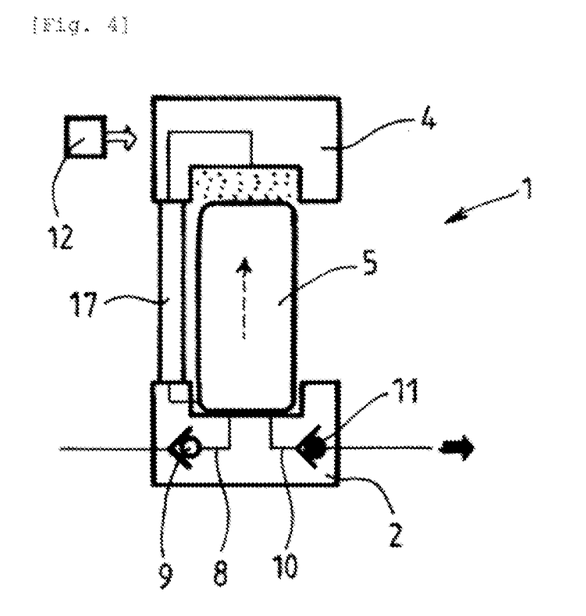
FIG. 4 shows the compression device in a third operating configuration.

The mass of excess fluid is then expelled via the valve 11 of the discharge pipe 10 at a preferably constant pressure.

It may be essential to keep the dead volume in the first end 3 of the compression chamber to a minimum in the event that the gas re-condenses due to the increase in pressure if it is desired to preserve an optimal ratio between the outgoing compressed flow rate and the flow rate of the regenerator. However, this effect should not prevent the compression device 1 from operating in the long term. The midpoint of the temperature gradient in the regenerator 17 then moves further toward the hot side (toward the second end 4). Then ([FIG. 4]), the piston 5 is moved again toward the second end 6 of the compression chamber. This moves the fluid from the second (hot) end 6 toward the first (cold) end 3 of the compression chamber. During this process, the mass flow moves from the second (hot) end 6 toward the first (cold) end 3. Therefore, no cooling power is needed (by virtue of the regenerator 17). For engineering purposes, some cooling power may be needed to compensate for the static charge due to the thermal radiation and the conduction from the supports and the regenerator 17.

When the fluid cools, the pressure in the compression device 1 begins to drop.

Figure 5:
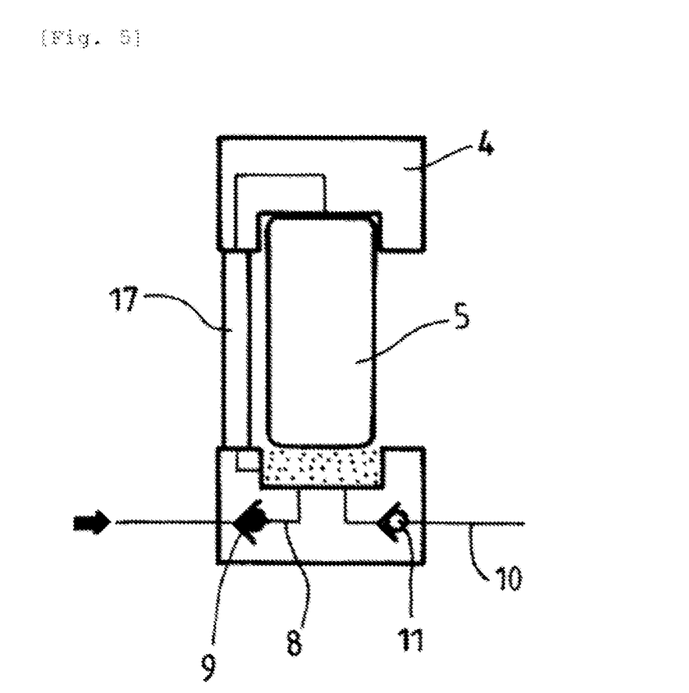
FIG. 5 shows the compression device in a fourth operating configuration.

When the pressure in the first end 3 of the compression chamber drops below a threshold, the valve 11 of the evacuation pipe 10 closes and the valve 9 of the supply pipe 8 can open again to restart the process, cf. [FIG. 5].

The compression device 1 can be supplied with gas or with liquid. In the latter case greater compression performance is obtained.

The compression device 1 can be used to compress hydrogen up to 900 bar or more from a tank of liquid with a mass flow rate of 10 to 100 g/s, for example.

The frequency of movement of the piston 5 has to be as high as possible since it results in a smaller compressor.

Assuming a gaseous hydrogen density at 21.5K of 1.225 kg/m$^3$, this means that 61.25 g of gas can be housed in the volume of the first end 3 of the compression chamber. At a frequency of 2 Hz, it would take a compression mass efficiency of less than ⅓ to reach the objective of 50 g/s. The total mass flow rate will be 122.5 g/s with a compressor mass flow rate of only 50 g/s (assuming greater mass compression efficiency losses due to the dead volume in the regenerator).

In the schematic depiction in [FIG. 7], the regenerator 17 has been symbolized by two heat exchangers disposed respectively in the two ends of the device 1.

This means that the two relatively hot and cold parts can be physically separated instead of being formed in one and the same continuous exchanger member.

Likewise, the fluid inlets and outlets are connected in parallel to one and the same pipe (the supply pipe 8 and the evacuation pipe 10 are connected to one and the same branch connected to the central part of the regeneration pipe 7, between the two heat exchange parts of the regenerator 17).

As illustrated, each end of the regeneration pipe 7 may also have a heat exchanger 18, 12 for heating or maintaining the temperature of the fluid before each of the first 3 and second ends of the compression chamber, respectively. For example, the exchangers 18, 12 can be integrated directly into the first 2 and second 4 ends of the device, respectively. The exchange of heat can be carried out between the fluid to be compressed and a heat transfer fluid that circulates in the exchanger.

These heat exchangers 18, 12 can be provided so as to maintain a stable operating temperature of the fluid in each of the ends of the compression chamber. It is not necessarily necessary to provide a heating switch.

The operating cycle of the compression device can be nearly continuous.

Of course, other embodiments are possible. Thus, for example, the fluid to be compressed can be injected into the compression device 1 at its cold (liquid) temperature and its latent heat of vaporization during the compression process can be used as a cold source.

Likewise, it is also possible to separate the incoming cold and outgoing hot fluid of the device 1 in [FIG. 7] by providing two separate pipes and by differentiating the points of connection to the heat exchangers forming the regenerator 17. Thus, the point of connection to the regenerator 17 can also be moved: between the two exchangers, at the top or at the bottom in the depiction. There may also be two separate connection points for the relatively hot fluid (at the top) and the relatively cold fluid (at the bottom).

Figure 8:
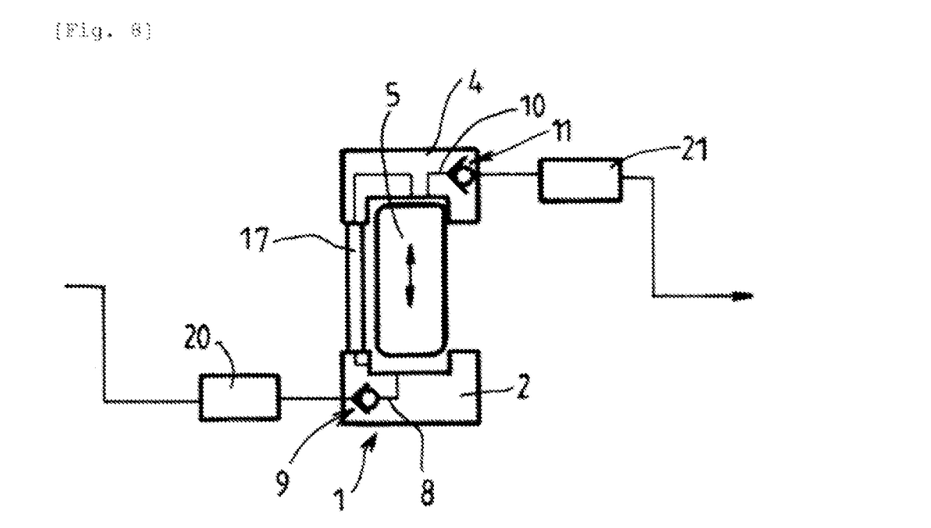
FIG. 8 shows a schematic and partial view illustrating an example of the structure and operation of another installation comprising a compression device according to the invention.

In the embodiment in [FIG. 8], the fluid to be compressed that feeds the supply pipe 8 can be pre-cooled in a heat exchanger 20. For example, fluid at a temperature of 300K and at a pressure between 10 and 80 bar can be brought to 200K in this exchanger 20. The discharge pipe 10 can be situated at the second end 4 of the device (relatively hotter side). At the outlet of the device 1, the compressed fluid can be placed in heat exchange with a heat exchanger 21 at 300K so as to provide, downstream, fluid having for example a temperature of 300K and a pressure of 20 to 186 bar, for example.

Figure 9:
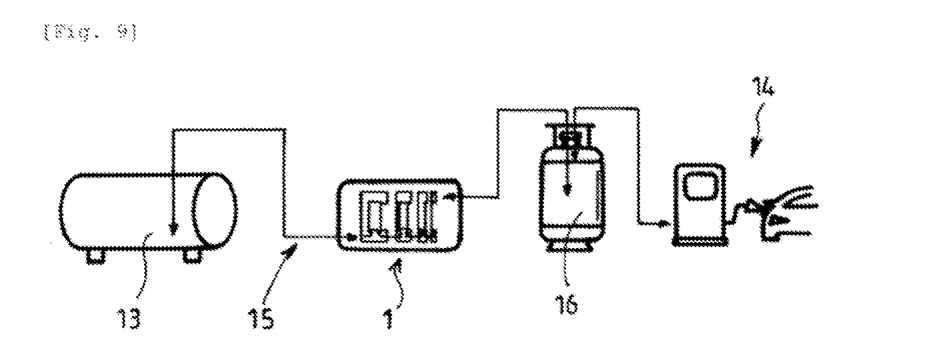
FIG. 9 shows a schematic and partial view in cross section illustrating a first exemplary embodiment of a filling station comprising a compression device according to the invention.

FIG. 9 describes an example of the use of a compression device 1 (preferably a plurality of devices 1 in series) in a hydrogen tank filling station. The source 13 may be a conventional liquefied gas storage tank. The transfer circuit 15 is for example a line that is thermally insulated in a vacuum. The compression device 1 (or the compression devices disposed in series, in particular two, three, four, five, six or seven compression stages, for example) can be disposed in a casing that is also vacuum-insulated (vacuum and multilayer insulation). The installation may also conventionally comprise one or more motors actuating the one or more pistons 5, the control electronics, and 50 to 500 kW class fan heaters at ambient temperature so as to increase the exchange of heat, these powers being the powers of heat to be exchanged. For example, for a hydrogen station delivering 2.5 t/day of fluid, a 150 kW class fan would be needed.

The compression device can produce gaseous hydrogen at a pressure of 900 bar, for example, toward one or more buffer stores 16. This buffer tank 16 can for its part supply the one or more terminal ends of the station.

Figure 10:
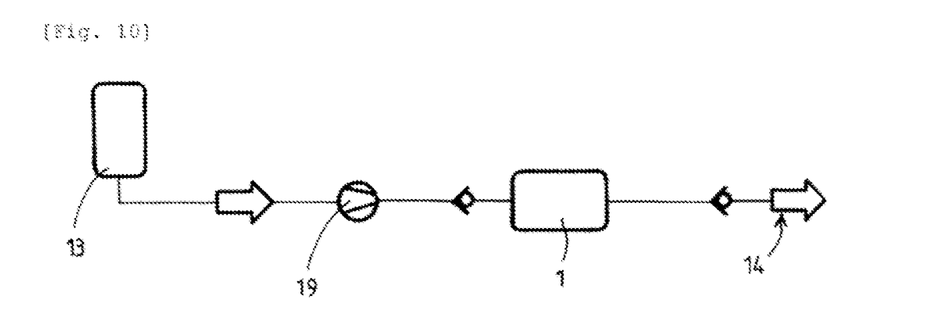
FIG. 10 shows a schematic and partial view in cross section of a second exemplary embodiment of a filling station comprising a compression device according to the invention.

In the embodiment in [FIG. 10], the transfer circuit 15 comprises a pump 19 disposed between the source 13 of liquefied gas and the compression device 1. At the intake, so the pump 19 can receive, for example, hydrogen at a pressure of a few bars, for example 6 bar and a temperature of approximately 30K (for example 27K). At the outlet of the pump 19, the fluid may have a temperature of the order of 60K, for example 58K, and a pressure of 300 to 400 bar or more. At the outlet of the compression device 1, the fluid may have a pressure of between 800 and 1000 bar, for example 950 bar, a temperature of 300 K and a flow rate of 45 kg/hour. Non-return valves may be provided respectively between the pump 19 and the compression device 1 and at the outlet of the compression device 1.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances so may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A fluid compression device, comprising:
   a compression chamber comprising a mobile piston;
   a first end accommodating a first end of the compression chamber;
   a second end accommodating a second end of the compression chamber, the piston being able to move in translation between the first and second ends of the compression chamber;
   a regeneration pipe connecting the first and second ends of the compression chamber and having a regenerator;
   a supply pipe comprising an upstream end intended to be connected to a source of fluid to be compressed and a downstream end opening into the first end of the compression chamber, the supply pipe comprising a set of one or more valves;
   a compressed fluid discharge pipe comprising an upstream end connected to the compression chamber and a downstream end intended to be connected to a receiver of the compressed fluid, the discharge pipe comprising a set of one or more valves, wherein the downstream end of the supply pipe is connected directly to the first end of the compression chamber without passing through a pre-compression chamber in the first end of the device and the regeneration pipe is separate from the discharge pipe.

2. The device of claim 1, wherein the upstream end of the compressed fluid discharge pipe is connected to the first end of the compression chamber.

3. The device of claim 1, wherein the set of one or more valves of the supply pipe comprises a non-return valve.

4. The device of claim 1, wherein the set of one or more valves of the discharge pipe comprises a non-return valve.

5. The device of claim 1, wherein the second end of the device comprises a heating system.

6. The device of claim 1, wherein the first end of the device comprises a cooling or heating system.

7. The device of claim 1, wherein the regenerator comprises a cylindrical heat exchanger tube filled with a material configured to store and release heat and to allow the fluid in the liquid and/or gaseous state to pass.

8. A compression installation comprising a plurality of the compression devices of claim 1, disposed in series.

9. A pressurized gas tank filling station, comprising:
   a source of liquefied gas; and
   a circuit for transferring fluid from the source toward a distribution end, wherein the transfer circuit comprises the compression device of claim 1.

10. The station of claim 9, wherein the transfer circuit further comprises at least one store of pressurized gas compressed by the compression device, said store being disposed between the compression device and the distribution end.

11. The station of claim 10, wherein the transfer circuit further comprises a pump disposed between the source of liquefied gas and the compression device.

12. A method for compressing fluid using the device of claim 1, comprising the following successive steps:
   a) admission of a fluid in the liquid or gaseous state at an initial pressure into the first end of the compression chamber via the supply pipe;
   b) movement of the piston toward the first end of the compression chamber and transfer of the fluid from the first end of the compression chamber toward the second end of the compression chamber via the regeneration pipe, the second end of the device being kept at a temperature higher than the temperature of the first end; and
   c) movement of the piston toward the second end of the compression chamber and transfer of the fluid from the second end of the compression chamber toward the first end of the compression chamber and the downstream end of the discharge pipe.

13. The method of claim 12, wherein the fluid is compressed at a flow rate of 10 to 100 grams per second.

14. A pressurized gas tank filling station comprising:
   a source of liquefied gas; and
   a circuit for transferring fluid from the source toward a distribution end, wherein the transfer circuit comprises the compression installation of claim 8.

15. The station of claim 14, wherein the transfer circuit further comprises at least one store of pressurized gas compressed by the compression device, said store being disposed between the compression device and the distribution end.

16. The station of claim 15, wherein the transfer circuit further comprises a pump disposed between the source of liquefied gas and the compression device.

17. A method for compressing fluid using the installation of claim 8, comprising the following successive steps:
  a) admission of a fluid in the liquid or gaseous state at an initial pressure into the first end of the compression chamber via the supply pipe;
  b) movement of the piston toward the first end of the compression chamber and transfer of the fluid from the first end of the compression chamber toward the second end of the compression chamber via the regeneration pipe, the second end of the device being kept at a temperature higher than the temperature of the first end; and
  c) movement of the piston toward the second end of the compression chamber and transfer of the fluid from the second end of the compression chamber toward the first end of the compression chamber and the downstream end of the discharge pipe.

18. The method of claim 17, wherein the fluid is compressed at a flow rate of 10 to 100 grams per second.

* * * * *